(12) United States Patent
Brown et al.

(10) Patent No.: US 7,913,056 B2
(45) Date of Patent: Mar. 22, 2011

(54) METHOD TO PERFORM PARALLEL DATA MIGRATION IN A CLUSTERED STORAGE ENVIRONMENT

(75) Inventors: Michael F. Brown, Brighton, MA (US); Kiran P. Madnani, Framingham, MA (US); David W. DesRoches, Methuen, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 12/020,609

(22) Filed: Jan. 28, 2008

(65) Prior Publication Data

US 2008/0147942 A1 Jun. 19, 2008

Related U.S. Application Data

(63) Continuation of application No. 11/017,554, filed on Dec. 20, 2004, now Pat. No. 7,343,467.

(51) Int. Cl.
G06F 12/00 (2006.01)
G06F 13/00 (2006.01)
G06F 13/28 (2006.01)
G06F 3/00 (2006.01)
G06F 11/00 (2006.01)
G06F 15/16 (2006.01)

(52) U.S. Cl. ........ 711/203; 711/114; 711/147; 711/150; 711/154; 711/156; 711/163; 711/165; 710/20; 710/21; 714/6; 714/19; 709/217

(58) Field of Classification Search .................. None
See application file for complete search history.

(56) References Cited

U.S. PATENT DOCUMENTS

| 5,459,864 | A | 10/1995 | Brent et al. |
| 5,673,381 | A | 9/1997 | Huai et al. |
| 5,680,640 | A | 10/1997 | Ofek et al. |
| 5,896,548 | A | 4/1999 | Ofek |

(Continued)

FOREIGN PATENT DOCUMENTS

EP 1130514 A2 9/2001

(Continued)

OTHER PUBLICATIONS

PCT/US2005/046433 International Search report; Aug. 9, 2006; 4 pgs.

*Primary Examiner* — Stephen C Elmore
*Assistant Examiner* — Marwan Ayash
(74) *Attorney, Agent, or Firm* — Guerin & Rodriguez, LLP; Michael Rodriguez

(57) ABSTRACT

A clustered storage array consists of multiple nodes coupled to one or more storage systems. The nodes provide a LUN-device for access by a client. The LUN-device maps to a source logical unit corresponding to areas of storage on the one or more storage systems. A target logical unit corresponds to different areas of storage on the one or more storage systems. The source logical unit is migrated in parallel by the multiple nodes to the target logical unit. Data to be copied from the source logical unit to the target logical unit are grouped into data chunks. Two or more of the plurality of nodes concurrently attempt to acquire an exclusive lock for a set of data chunks. The node acquiring the exclusive lock migrates the set of data chunks from the source logical unit to the target logical unit, while the exclusive lock is used to prevent other nodes from migrating the set of data chunks.

18 Claims, 6 Drawing Sheets

U.S. PATENT DOCUMENTS

| | | | |
|---|---|---|---|
| 5,924,097 A | 7/1999 | Hill et al. | |
| 6,073,218 A * | 6/2000 | DeKoning et al. | 711/150 |
| 6,145,066 A * | 11/2000 | Atkin | 711/165 |
| 6,598,134 B2 * | 7/2003 | Ofek et al. | 711/162 |
| 6,601,138 B2 * | 7/2003 | Otterness et al. | 711/114 |
| 6,934,724 B1 | 8/2005 | Deshayes et al. | |
| 6,959,313 B2 * | 10/2005 | Kapoor et al. | 707/205 |
| 7,093,088 B1 | 8/2006 | Todd et al. | |
| 2003/0028514 A1 * | 2/2003 | Lord et al. | 707/1 |

FOREIGN PATENT DOCUMENTS

| | | |
|---|---|---|
| EP | 1310876 | 5/2003 |

\* cited by examiner

METHOD TO PERFORM PARALLEL DATA MIGRATION IN A CLUSTERED STORAGE ENVIRONMENT

RELATED APPLICATION

This application is a continuation application claiming priority to U.S. patent application Ser. No. 11/017,554, filed on Dec. 20, 2004, the entirety of which U.S. patent application is incorporated by reference herein.

FIELD OF THE INVENTION

The present invention relates generally to the field of data migration, and particularly to methods of providing parallel data migration.

BACKGROUND OF THE INVENTION

In today's computing environments, client computers typically have access to one or more storage systems that may be local or remotely accessed via a channel or network. The storage available to the client is typically presented as volumes, or logical units.

It is often necessary to move, or "migrate", the data from one volume to another volume. Data migrations are transparent to the clients; that is, the clients continue to access the same logical drive although the drive data is being moved from one physical storage location to another. A migration may be necessary when data must be moved to newly attached storage, or when node failures occur, or to optimize storage space usage and/or performance. Data migration is a time consuming process because the volumes tend to be quite large. Further, if the node controlling the migration fails, data can be permanently lost. Migrations can therefore have deleterious performance effects on the systems affected.

There is a need for a higher performance data migration solution than those existing today, and a further need for a data migration solution that is resistant to node failures.

SUMMARY OF THE INVENTION

In accordance with the principles of the invention, a plurality of nodes is coupled to or integrated with one or more storage systems. The nodes provide a LUN-device for access by a client, the LUN-device mapping to a source logical unit corresponding to areas of storage on the one or more storage systems. A target logical unit corresponds to different areas of storage on the one or more storage systems. The source logical unit is migrated in parallel by two or more of the plurality of nodes to the target logical unit.

More particularly, the migration is accomplished as follows. Chunks of data to be moved from the source logical unit to the target logical unit are defined. A bit-mask is provided having one bit for each chunk. Each bit is initially reset. The bit-mask is divided into splices of multiple bits. The following steps are then performed by each of two or more of the plurality of nodes until the source logical unit has been fully migrated to the target logical unit. The node attempts to lock a splice. If the node successfully locks the splice, then the node copies the chunks of data corresponding to each bit in the splice to the target logical unit. The node then sets the bits in the bit-mask corresponding to the copied chunks. The node then unlocks the splice when all the chunks corresponding to the bits in the splice have been copied. If the splice could not be locked, then another node has locked it and is migrating the splice's corresponding chunks.

In accordance with a further aspect of the invention, the plurality of nodes comprises a clustered system. The source logical unit and target logical unit are logical entities utilizing the clustered system to access the corresponding areas of storage. The step of copying the chunks operates over the clustered system.

According to another aspect of the invention, a migration operation can be cancelled at any time. If a user submits a cancel command to any node, the logical unit and the LUN-device that maps to it are preserved, and the target logical unit and bit mask are deleted.

According to a further aspect of the invention, the bit mask is shared among nodes within the clustered system. Migration is complete when all of the data is copied over to the destination, and thus all of the bits in the bit mask are set. One or more mirrored copies of the bit mask are maintained in the clustered system. These mirrored copies are updated in sequence to ensure only one copy is being modified at any time. This mirroring improves the bit mask's fault tolerance.

According to another aspect of the invention, an I/O access can be performed by a client to the LUN-device during the migration. If the I/O access is a read access, the data is returned from the source logical unit to the client. If the I/O access is a write access including data to be written, then the node first ascertains the chunk to which data is to be written. It then locks the splice containing the chunk. If all the bits in the splice are set, then the data is written to the source logical unit and the target logical unit. If less than all of the bits in the splice are set, then the chunks of data in the splice are read from the source logical unit, combined with the data to be written, and the combined data is written to the source and target logical units. The chunk's bits in the splice are set. The splice is then unlocked.

The parallel migration scheme of the invention provides a higher performance, more fault tolerant migration solution than those previously available.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

In accordance with the principles of the invention, several nodes are coupled to one or more storage systems. A client coupled to the nodes can access LUN-devices corresponding to areas of storage on the storage systems. When a given LUN-device needs to be migrated, its corresponding logical unit becomes a source logical unit as it is migrated in parallel to a target logical unit by at least some of the several nodes. Because the migration occurs in parallel across several nodes, the speed of the migration is greatly improved, thereby improving the performance of the system as a whole. Furthermore, the migration operation can proceed despite the failure of a node, thereby providing a measure of fault tolerance for the migration.

Figure 1:
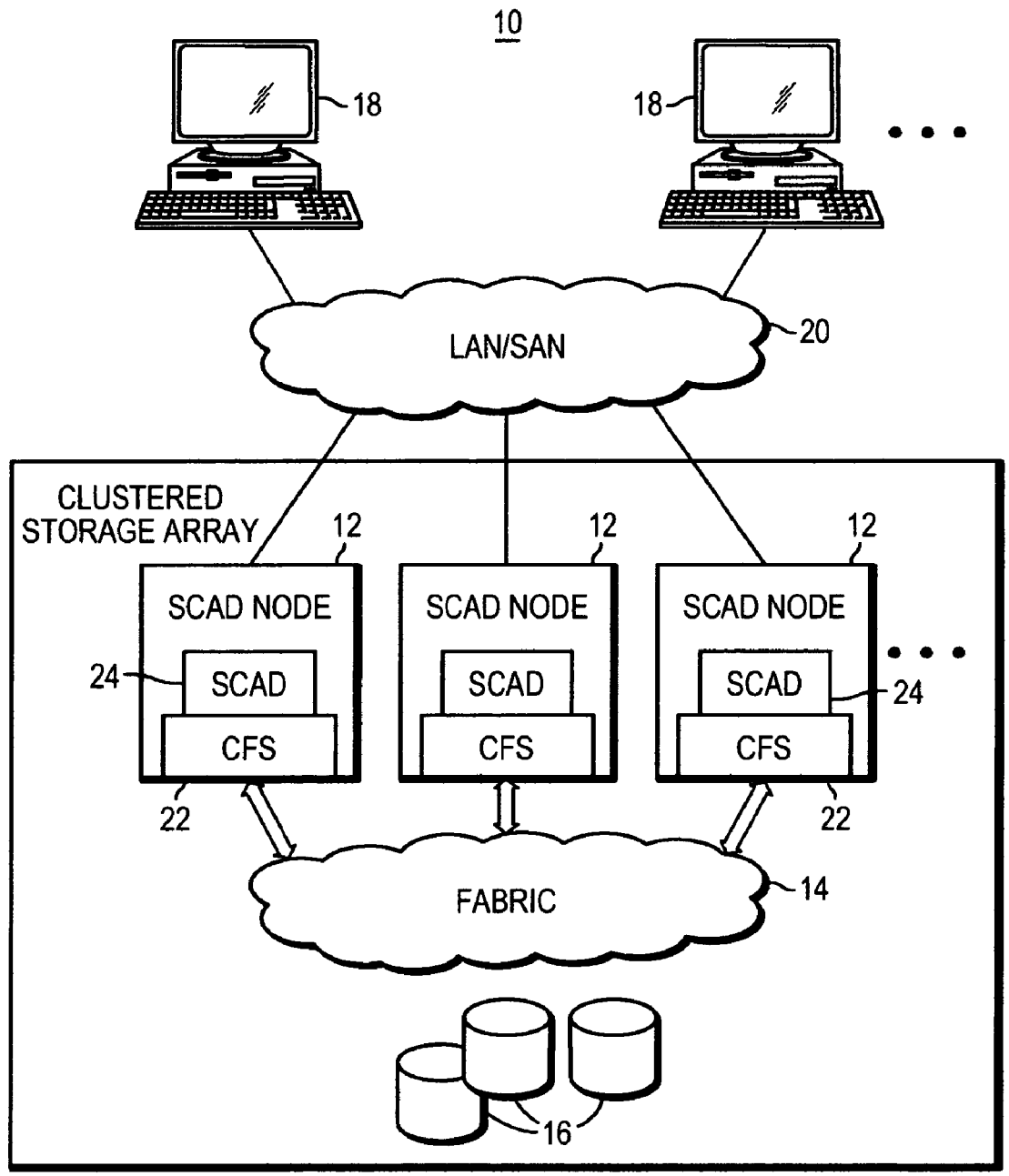
FIG. 1 is a schematic view of a system in which the invention is implemented.

Referring to FIG. 1, there is shown a system 10 in which the invention is incorporated. Two or more nodes 12 are coupled on a network 14, which may be an IP network, a Fibre Channel SAN, some other interconnect, or a combination thereof. The network 14 couples the nodes to storage systems 16. Clients 18 are coupled via a network 20 to each of the nodes 12. The network 20 may be for example an IP network, a Fibre Channel SAN, some other interconnect, or a combination thereof. Each node 12 implements clustered system software 22. The clustered system software 22, among other things, is required to maintain data coherency amongst the nodes presenting access to the data. That is, as the multiple clients 18 access and write to the same data, the shared cluster system software 22 ensures that the data is coherent; i.e. consistently exposed to all the clients. Clustered systems further employ metadata, which is used among other things to ensure data coherency. The clustered systems also ensure coherency of metadata against node failures. Many clustered systems use one of many types of shared file system software. Network file systems (NFS) allow access to shared files by multiple clients via a server that owns the shared file. Clustered file systems (CFS) allow concurrent shared access to files through any node, and provide failover of resources in the event of a node failure. In accordance with the preferred embodiment, the shared file system 22 is a CFS. Examples of CFSs are GFS (Global File System) from Red Hat, Fusion from IBRIX, and GPFS (General Parallel File System) from IBM. The nodes 12 and storage systems 16 of FIG. 1 are shown as separately implemented, for example as servers and storage arrays. However, nodes 12 and storage system 16 may be incorporated within a system. Note that while the particular application described herein uses a clustered file system, the application described herein is generally applicable to clustered systems.

The invention results in part from the realization that it would be highly advantageous to provide a storage array of block storage devices that leverages the advantages of a clustered system. Clients coupled to such a system would have concurrent shared access to logical block storage devices, i.e. logical units (LUNs). The clustered system would ensure coherency of the data on those shared LUNs. Nodes 12 in the clustered system present LUNs to clients through a "LUN-device" entity. A single LUN-device corresponds to a single logical unit that exists in the storage system. The invention thus provides software for implementing a clustered storage array layered on a clustered system. This software is named "SCAD". Thus shown in FIG. 1 is SCAD software 24 for implementing the clustered storage array. Nodes implementing the SCAD software 24 are herein referred to as SCAD nodes.

Figure 2:
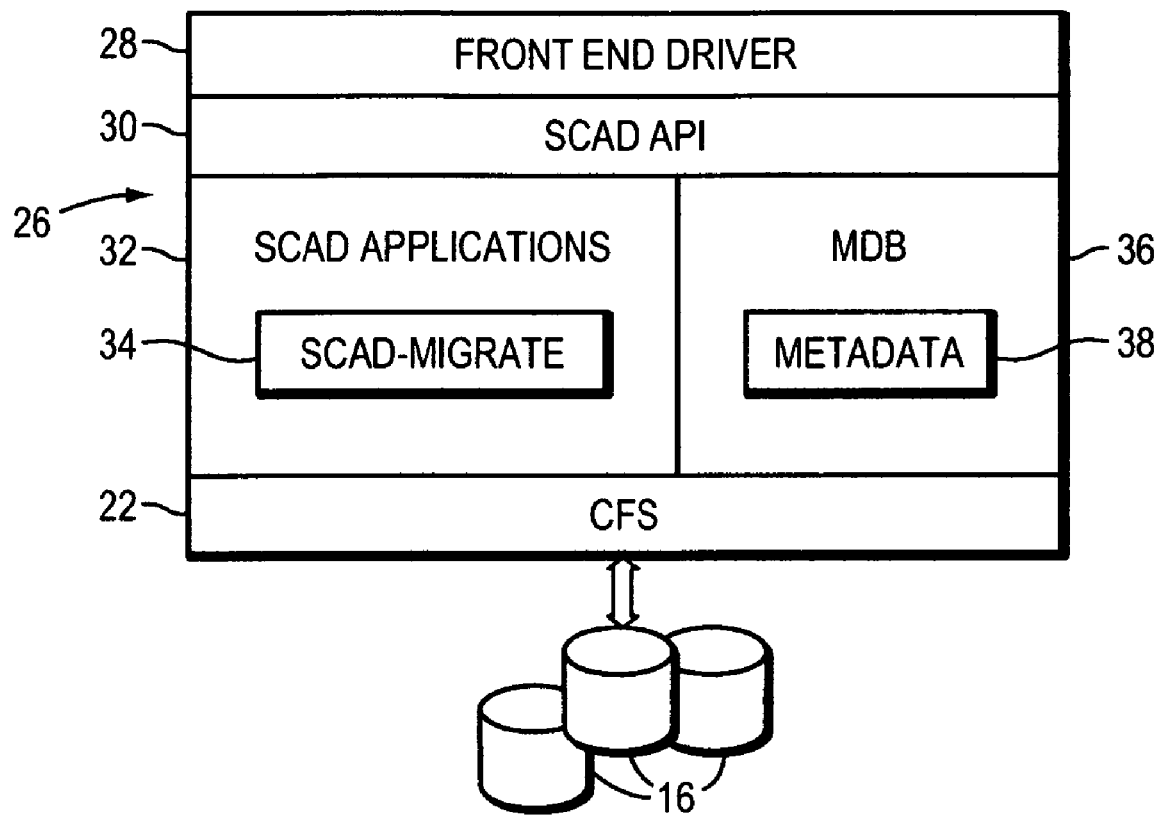
FIG. 2 is a representation of an I/O stack including the migration application of the invention.

The SCAD software 24 is shown in more detail in FIG. 2. The SCAD software 24 is an I/O software stack 26 built to run on top of the CFS 22. The SCAD stack 26 leverages the advantageous features of the CFS 22, including high availability and coherency of shared data, to expose shared LUNs to the clients.

The front end driver 28 of the stack is the media driver for interfacing to the clients 18. The SCAD API 30 exposes SCAD "devices" to the front end 28. SCAD devices are byte-addressable logical units ("LUN-devices") that use files created by the underlying CFS as their backing store. LUN-devices are preferably presented to the clients 18 as SCSI LUNs by the front end driver 28, though other storage medias could be implemented. Below the SCAD API are SCAD layered applications 32 that implement various types of operations to be performed for LUN-devices. One SCAD layered application 32 is the SCAD Migrate application 34, to be further described. Below the SCAD layer is the CFS. A layer within SCAD is the metadata manager (MDB) 36 that resides between the CFS and the SCAD applications. The MDB leverages the locking mechanisms provided by the CFS to allow for coherent cluster-wide sharing of data and coherency of SCAD metadata. This SCAD metadata 38 supports the SCAD Migrate application. The MDB mirrors the metadata 38 it manages to make it highly available, as will be further described. This mirroring is transparent to the SCAD layers above the MDB.

Figure 3:
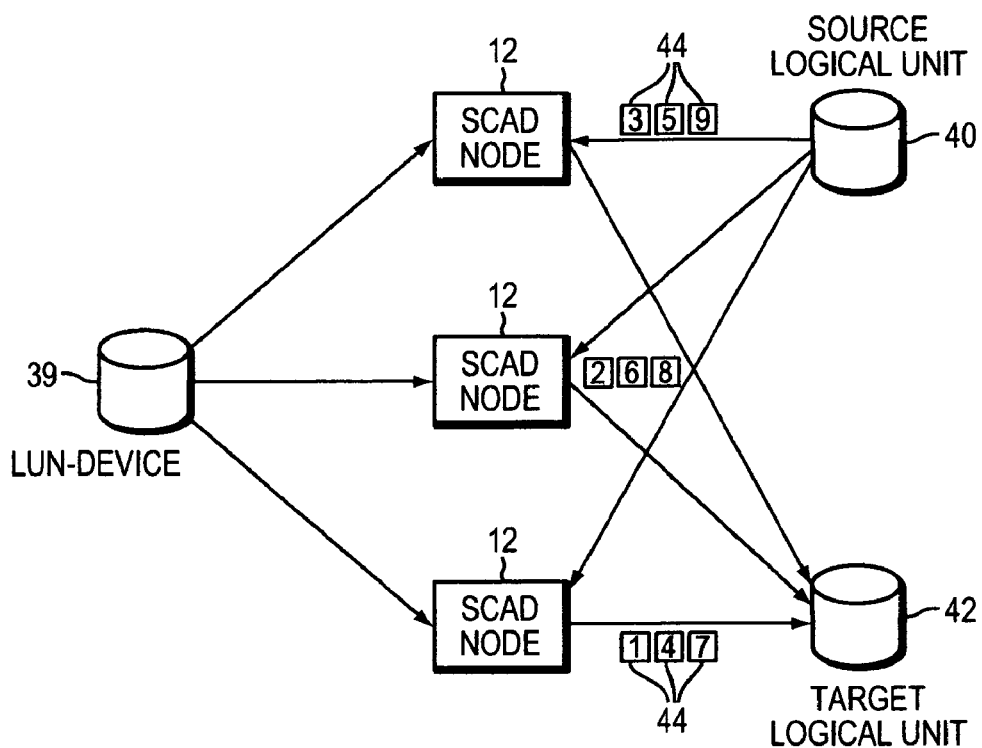
FIG. 3 is a representation of a parallel migration of chunks of data from a source logical unit to a destination logical unit through multiple nodes in accordance with the invention.

The SCAD-migrate application 34 is now described in further detail. Referring to FIG. 3, a LUN-device 39 is shown mapped to a source logical unit 40. The SCAD-migrate application 34 allows transparent online data migration of the "source" logical unit 40 to a migration, or "target" logical unit 42. The target logical unit 42 is treated as a regular LUN-device by the SCAD layers below the migrate layer, and is kept hidden from the layers above. All clients 18 continue to have access to the migrating device during the migration. Once the migration is complete, the clients 18 access what appears to be the same LUN-device 39, except its data is now located at the target logical unit 42. In accordance with the invention, multiple nodes 12 are responsible for servicing the Background migration of any logical unit. All the nodes 12 may participate, or a subset of the nodes 12 may participate if for some reason a node has failed or is busy with a priority task. The participation of the multiple nodes allows for maximum parallelism in performing the migration operation, thereby maximizing system performance and providing a level of fault tolerance to the operation.

The SCAD-migrate's target logical unit is the same size as the source logical unit. The target logical unit has a migrate "chunk" size assigned to it when it is created—for example, 32 Kbytes. The source logical unit is moved to the target logical unit chunk 44 by chunk 44 by the nodes 12 in parallel.

Figure 4:
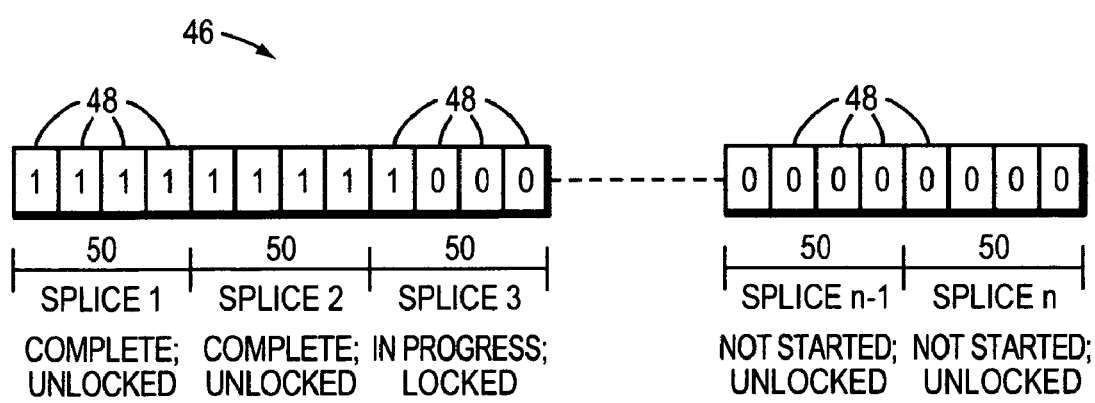
FIG. 4 is a representation of the bit-mask metadata divided into splices.

As shown in FIG. 4, the metadata 38 is shown to include a bit-mask 46 associated with the target logical unit. Each bit 48 in the bit-mask 46 corresponds to a chunk that is to be written to the target logical unit 42 from the source logical unit 40. The bit-mask 46 is divided into "splices" 50, wherein each splice 50 is a fixed number of bits 48 in the bit-mask 46. Prior to the migrate operation all of the bits 48 are reset, shown as "0". Each SCAD node 12 attempts to sequentially lock each splice 50 and migrate the data chunks 44 corresponding to each successfully locked splice 50 from the source logical unit 40 to the target logical unit 42. After completion of the data migration for each chunk 44 in a splice 50, its corresponding bit 48 is set.

Figure 5:
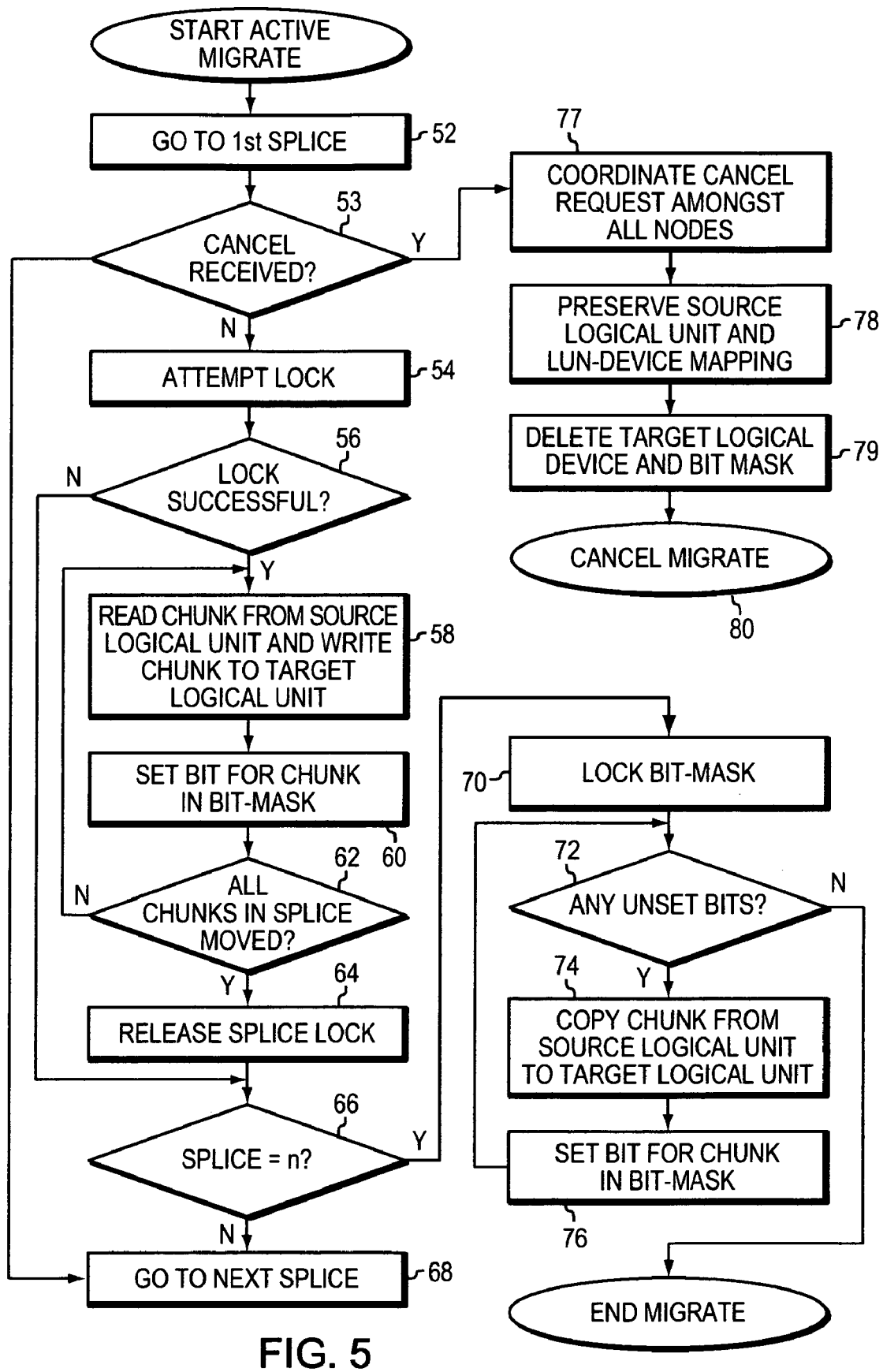
FIG. 5 is a flow diagram of a Background migration operation.

There are two types of Migrate operations: client I/O driven migrate operations, referred to as Foreground migrate operations herein, and Background migrate operations. Background migrate operations occur during an ongoing transparent migration session of a LUN-device 40. A separate thread on each SCAD node is spawned for the purpose of migrating data from the LUN-device 39's source logical unit 40 to the target logical unit 42. Referring to FIG. 5, the steps taken by each node are shown. First, from the beginning of the bit-mask 46, each node attempts to lock a bit-mask splice 50 (steps 52, 54.) The locking mechanism is preferably implemented in accordance with POSIX record locking provided via the fcntl system call as described in IEEE standard 1003.1. If the lock attempt succeeds (step 56), each chunk 44 of the splice 50 is read from the source logical unit 40 and then written to the target logical unit 42 (step 58). The bit 48 in the bit-mask 46 corresponding to the chunk 44 is then set (step 62). When all chunks 44 have been copied (step 62), the splice lock is released (step 64). If the lock attempt fails (step 56), these chunks 44 are skipped, since another SCAD node 12 must have obtained the lock and is already migrating the data. If the last splice 50 has not been reached (step 66), the SCAD node 12 returns to attempt to lock the next splice 50 (step 68, step 54). Once each splice 50 has been locked and its corresponding chunks 44 migrated (step 66), the entire MDB bit-mask 46 is locked (step 70) and the state of each bit 48 is checked (step 72). Chunks 44 corresponding to any unset bits remaining as a result of Foreground migrate operations (to be described) are copied from the source logical unit 40 to the target logical unit 42 (step 74), and the bits 48 are set (step 76).

In FIG. 4 there is shown an example of the result of the execution of the Background migration operation of FIG. 3 on each node. The chunks 44 corresponding to the bits 48 in the first splice 50 ("splice 1") have all been migrated by a first node 12; therefore the bits 48 are set and the splice is now unlocked. The chunks 44 corresponding to the bits 48 in the second splice 50 ("splice 2") have been migrated by a second node, so these bits 48 are set and this splice 50 is also unlocked. The chunks 44 corresponding to the bits 48 in the third splice 50 ("splice 3") have not all been migrated, so some of the bits 48 are not set, thus this splice 50 is still locked by a node. The migrations for the chunks 44 corresponding to the bits 48 in the last two splices 50 ("splice n−1", "splice n") have not begun, thus their bits 48 are not set and these splices 50 are still unlocked.

In accordance with a further aspect of the invention, a Background migrate operation can be cancelled at any time during the migration by a user. As shown in FIG. 5, during a migration a user can issue a cancel command to one of the several nodes 12. If the cancel command is received (step 53), the node 12 would use the clustered system to coordinate the cancel request amongst its peer nodes. Once this has been established (step 77), the source logical unit 40 and its corresponding LUN-device 39 are preserved (step 78), and the target logical unit 42 and corresponding bit mask 46 are deleted (step 79). The migrate operation is now cancelled (step 80). Foreground migrate operations are those that are prompted by client I/O accesses to the LUN-device during a Background migration operation.

Figure 6:
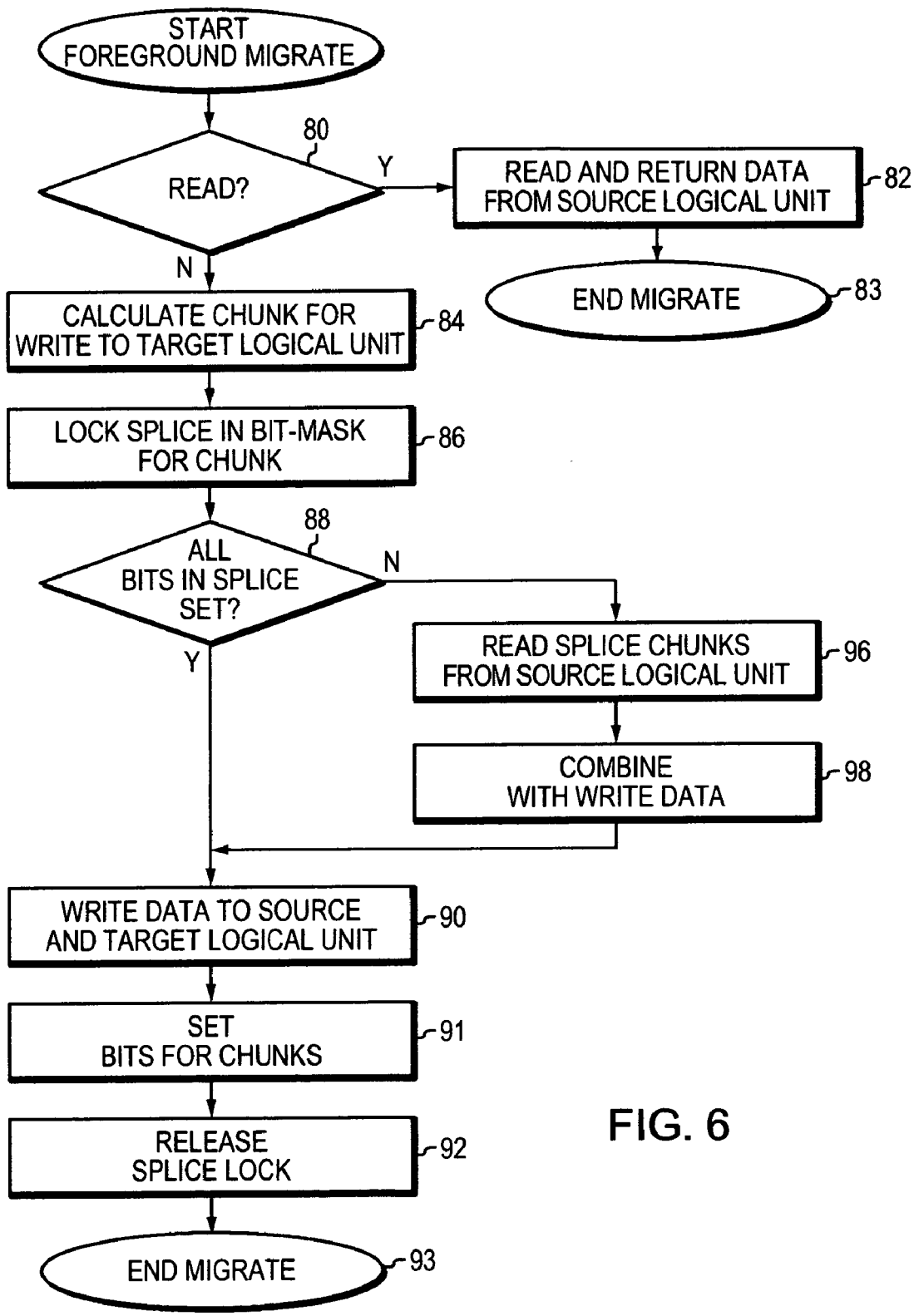
FIG. 6 is a flow diagram of a Foreground operation.

Foreground migrate operations are handled as shown in FIG. 6. If the client I/O access is a read request (step 81), the SCAD-migrate application 34 reads from the source logical unit 40 and returns the data (step 82) to complete the operation (step 83). If the client I/O access is a write request, then the chunk 44 that maps to the logical block address of the write in the target logical unit 42 is calculated (step 84). Its corresponding splice 50 in the bit-mask 46 is locked (step 86). The bit-mask 46 metadata is checked to ascertain how much of the write access' source data is in the target logical unit 42. If all the splice bits are set (step 88), all the data has already been migrated from the source logical unit 40 to the target logical unit 42. The bit-mask 46 is therefore left unchanged. The write access is passed from SCAD-migrate to the lower layers to both the source and target logical units 40 and 42 (step 90), the bits for the chunks are set (step 91), and the splice lock is released (step 92). If some or none of the splice bits are set (step 88), some or none of the data has been migrated to the target logical unit. In this case, the corresponding chunk(s) 44 are read from the source logical unit 40 (step 96), combined with the write data (step 98), and then written to both the source and target logical units 40 and 42 (step 90). The corresponding chunk bits are set (step 91) and the splice lock is released (step 102), completing the operation (step 93).

Figure 7:
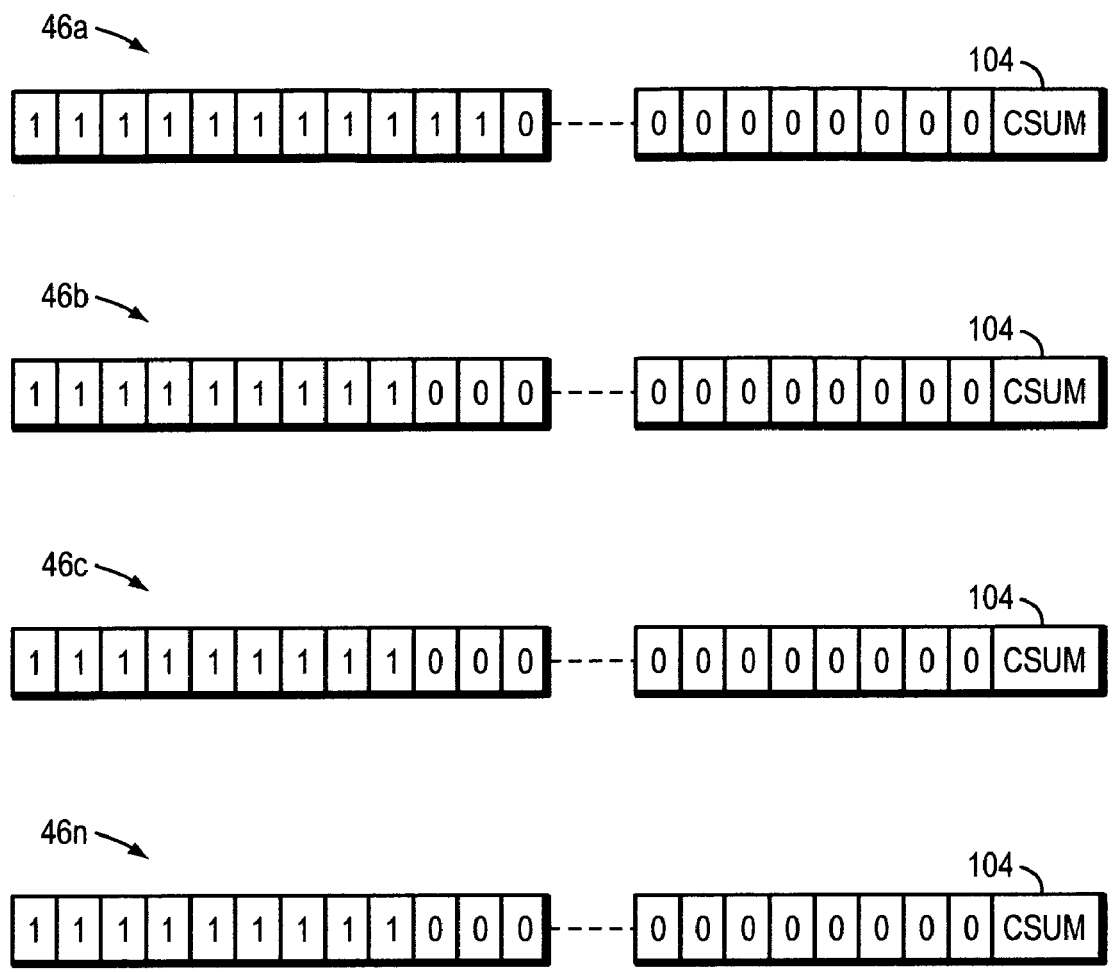
FIG. 7 is a representation of multiple copies of the bit-mask.

In accordance with a further aspect of the invention, steps are taken in the management of the SCAD metadata 38 to ensure data integrity in light of a node failure. If the MDB 36 is modifying SCAD metadata 38 at the time a node fails, it could leave that metadata 38 in an unknown state. This is impermissible, as metadata coherency must always be maintained in order to ensure data integrity. So, to increase metadata 38 availability, the MDB 36 maintains multiple copies 46*a*-46*n* of the bit-mask 46 on disk, as shown in FIG. 7. It performs updates to those bit-mask copies in synchronous sequence. This ensures that there is always at least one copy of any piece of metadata, either old or updated, that is not currently being modified. Any number of copies of the bit-mask 46 may be used, and it may be convenient to use just two. In addition, a checksum 104 is calculated and stored with each piece of metadata. If a node fails, a surviving node can scan all of the copies of metadata on disk and ascertain which copies have the latest valid information for each metadata piece. The surviving node(s) would check the copies in the same sequence as the MDB does its synchronous sequential updates. The checksum 104 for each copy would be calculated and compared to the on-disk value. The first copy found to have a matching checksum 104 is declared the valid copy of the metadata 38, and all the other copies are synchronized to it.

The previously described SCAD migrate operations and metadata management assure correctness of both user data and metadata in the face of multiple error scenarios. Consider the following error scenarios:

1. A SCAD node fails after obtaining a bit-mask lock but before completing the migration write:
a. User data: is still intact because the source location hasn't been modified.
b. Metadata: The bit-mask 46 has not been written, so it still reflects the fact that the migrate operation was not completed. So, in this case, the source location is still the valid location of user data.

2. A SCAD node fails after performing the migration operation but before updating the corresponding bits in the bit-mask:
a. User data: user data safely exists in both the source and destination locations.
b. Metadata: the bits 48 in the bit-mask 46 indicate that the migrate has not been performed, so the source location is referred to as the true location of the data. The copy of the user blocks that has already been done is ignored and needs to be performed again when the migration operation is resumed.

3. A SCAD node fails after migration, during the updating of the bit-mask:
a. User data: user data exists in both the source and destination locations.
b. Metadata: the bit-mask 46 is recoverable due to the multiple copies and checksums previously described. Surviving nodes can use the multiple copies and checksums to detect invalid metadata and perform a "fixup" of all copies so that it matches either the old value, which refers to the source as valid, or the new value, which refers to the destination as valid. The old value results in scenario 2 above, and the new value results in scenario 4 below.

4. A SCAD node fails after setting the appropriate bits in the bit-mask, but before releasing the bit-mask lock:

a. User data: user data exists in both the source and destination locations.
b. Metadata: is valid. In this case, the CFS beneath the SCAD stack is responsible for clearing the lock.

All of the above innovative mechanisms combine to provide a migration solution that is higher performance and more fault tolerant than previously known solutions. It is further noted that the mechanisms previously described can be used to implement operations other than a volume migration. For example, a snap copy of a volume or a section of a volume could be performed using the described mechanisms. In this case, a source logical unit would be copied to a target logical unit, with the source logical keeping its mapping to its current LUN-device, and the target logical unit being made available for client access by becoming mapped to its own LUN-device.

Aspects of the present invention may be embodied as program product in or on computer-readable medium having embodied therein a computer program. Examples of computer-readable medium in which the computer program may be embodied include, but are not limited to, a floppy disk, a hard-disk drive, a CD-ROM, a DVD-ROM, a flash memory card, a USB flash drive, an non-volatile RAM (NVRAM or NOVRAM), a FLASH PROM, an EEPROM, an EPROM, a PROM, a RAM, a ROM, a magnetic tape, or any combination thereof.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the invention. Further, although aspects of the present invention have been described herein in the context of a particular implementation in a particular environment for a particular purpose, those of ordinary skill in the art will recognize that its usefulness is not limited thereto and that the present invention can be beneficially implemented in any number of environments for any number of purposes.

What is claimed is:

1. A method of migrating data from a source logical unit to a target logical unit, the source and target logical units corresponding to different areas of storage on one or more storage systems, the method comprising the steps of:
   providing a clustered storage array comprised of a plurality of nodes interconnected with each other and in communication with the one or more storage systems by a network;
   running, by each node of the plurality of nodes, shared file system software to enable multiple clients to concurrently access shared data in the one or more storage systems through any of the nodes, and clustered system software to ensure coherency of the shared data;
   providing by the nodes a LUN-device for shared access by the multiple clients, the LUN-device mapping to the source logical unit;
   grouping data that are to be copied from the source logical unit to the target logical unit into data chunks;
   concurrently attempting, by two or more of the plurality of nodes, to acquire an exclusive lock for a set of data chunks;
   providing a bit-mask having one bit for each data chunk;
   dividing the bit-mask into splices of multiple bits;
   uniquely associating each splice with one set of data chunks;
   wherein the step of concurrently attempting to acquire the exclusive lock for a set of data chunks includes the step of attempting to acquire an exclusive lock on the splice associated with said set of data chunks, and
   migrating, by the node that acquires the exclusive lock, the set of data chunks from the source logical unit to the target logical unit, while the exclusive lock is used to prevent other nodes from migrating the set of data chunks.

2. The method of claim 1, wherein the step of migrating includes: copying, for each bit in the splice, the data chunk corresponding to that bit to the target logical unit; setting each bit in the splice corresponding to a copied data chunk; and unlocking the splice when all data chunks corresponding to the bits in the splice have been copied.

3. The method of claim 1, further comprising the steps of: storing multiple copies of the bit-mask, each bit-mask copy having an associated checksum; and if any one node of the plurality of nodes fails, checking by one or more of the other node the checksums to identify a valid copy of the bit-mask.

4. The method of claim 3, further comprising the step of performing synchronous sequential updates to the copies of the bit-mask to ensure only one bit-mask copy is being updated at any given time.

5. The method of claim 1, further comprising the steps of: performing an I/O access by one of the nodes from a client to the LUN-device during the step of migrating, the step of performing comprising the steps of: if the I/O access is a read access, returning data from the source logical unit to the client; if the I/O access is a write access including data to be written: ascertaining the data chunk to which data is to be written: locking the splice corresponding to the data chunk; if all the bits in the splice are set, then writing the data to be written to the source logical unit and the target logical unit; if less than all of the bits in the splice are set, then reading the data chunks in the splice from the source logical unit, combining the data to be written with the data chunks read, and writing the combined data to the target logical unit and source logical unit; setting the bits in the bit-mask corresponding to the copied data chunks; and unlocking the splice.

6. The method of claim 1, wherein the step of grouping the data includes sequentially ordering the splices; and wherein the step of attempting to acquire an exclusive lock on the splice includes accessing each splice in sequential order to find the next splice that is currently unlocked.

7. The method of claim 1, further comprising the step of canceling the migrating at any time during the migrating by coordinating the cancel request amongst the plurality of nodes, preserving the source logical unit and its corresponding LUN-device, and deleting the target logical unit.

8. The method of claim 1, wherein the plurality of nodes comprises a clustered system, and wherein the source logical unit and target logical unit are logical entities utilizing the clustered system to access the corresponding areas of storage, and wherein the migrating of data chunks operates over the clustered system.

9. The method of claim 1, wherein the set of data chunks is a first set and the node that acquires the exclusive lock for the first set is a first node, and further comprising the steps of: acquiring by a second node of the plurality of nodes an exclusive lock for a second set of data chunks; and migrating, by the second node, the second set of data chunks from the source logical unit to the target logical unit in parallel to the migrating of the first set of data chunks by the first node.

10. A clustered system comprising:
   at least one hardware storage system including a source logical unit and a target logical unit, the source and target logical units corresponding to different areas of storage on the one or more storage systems; and a clustered storage array comprised of a plurality of nodes interconnected with each other and in communication with the one or more storage systems by a network, each node running shared file system software to enable multiple clients to concurrently access shared data in the one or more storage systems through any of the nodes and clustered system software to ensure coherency of the shared data, the nodes providing, for shared access by the multiple clients, a LUN-device mapped to the source logical unit, each node including logic for grouping data that are to be copied from the source logical unit to the target logical unit into data chunks and logic for attempting to acquire an exclusive lock for a set of said data chunks, the system further comprising a bit-mask having one bit for each data chunk;

logic for dividing the bit-mask into splices of multiple bits;

logic for uniquely associating each splice with one set of data chunks; and wherein the logic for attempting to acquire the exclusive lock for a set of data chunks includes logic for attempting to acquire an exclusive lock on the splice associated with said set of data chunks, and wherein two or more of the plurality of nodes concurrently attempt to acquire an exclusive lock for the set of data chunks, with the node that acquires the exclusive lock migrating the set of data chunks from the source logical unit to the target logical unit, while the exclusive lock is used to prevent other nodes from migrating the set of data chunks.

11. The clustered system of claim 10, wherein the node that migrates the set of data chunks includes: logic for copying, for each bit in the splice, the data chunk corresponding to that bit to the target logical unit; logic for setting each bit in the splice corresponding to a copied data chunk; and logic for unlocking the splice when all data chunks corresponding to the bits in the splice have been copied.

12. The clustered system of claim 10, further comprising: memory storing multiple copies of the bit-mask, each bit-mask copy having an associated checksum; and wherein each node includes logic, operational if any one node of the plurality of nodes fails, for checking the checksums of the bit-mask copies to identify a valid copy of the bit-mask.

13. The clustered system of claim 12, further comprising logic for performing synchronous sequential updates to the copies of the bit-mask to ensure only one bit-mask copy is being updated at any given time.

14. The clustered system of claim 10, wherein each node further comprises logic for performing an I/O access from a client to the LUN-device during the migrating of the set of data chunks, the logic for performing comprising: logic for returning data from the source logical unit to the client if the I/O access is a read access; and if the I/O access is a write access including data to be written: logic for ascertaining the data chunk to which data is to be written, logic for locking the splice corresponding to the data chunk, logic for writing the data to be written to the source logical unit and the target logical unit if all the bits in the splice are set, logic for reading the data chunks in the splice from the source logical unit, combining the data to be written with the data chunks read, and writing the combined data to the target logical unit and source logical unit if less than all of the bits in the splice are set; logic for setting the bits in the bit-mask corresponding to the copied data chunks; and logic for unlocking the splice.

15. The clustered system of claim 10, wherein the logic for grouping the data includes logic for sequentially ordering the splices; and wherein the logic for attempting to acquire an exclusive lock on the splice includes logic for accessing splices in sequential order to find the next splice that is currently unlocked.

16. The clustered system of claim 10, further comprising the logic for canceling the migrating at any time during the migrating by coordinating the cancel request amongst the plurality of nodes, preserving the source logical unit and its corresponding LUN-device, and deleting the target logical unit.

17. The clustered system of claim 10, wherein the source logical unit and target logical unit are logical entities utilizing the clustered system to access the corresponding areas of storage.

18. The clustered system of claim 10, wherein the set of data chunks is a first set and the node that acquires the exclusive lock for the first set is a first node, and wherein a second node of the plurality of nodes includes logic for acquiring an exclusive lock for a second set of data chunks; and further comprising logic for migrating, by the second node, the second set of data chunks from the source logical unit to the target logical unit in parallel to the migrating of the first set of data chunks by the first node.

* * * * *